United States Patent
McCord

(10) Patent No.: US 11,457,568 B2
(45) Date of Patent: Oct. 4, 2022

(54) MULTIPLE COLORS, AND COLOR PALETTES, OF NARROWBAND PHOTOSYNTHETICALLY ACTIVE RADIATION (PAR) TIME-STAGED OVER HOURS, DAYS, AND GROWING SEASONS YIELDS SUPERIOR PLANT GROWTH

(71) Applicant: SYMBIOTIC SYSTEMS, INC., San Diego, CA (US)

(72) Inventor: Matthew McCord, San Diego, CA (US)

(73) Assignee: Symbiotic Systems, Inc., San Diego, CA (US)

( * ) Notice: Subject to any disclaimer, the term of this patent is extended or adjusted under 35 U.S.C. 154(b) by 0 days.

(21) Appl. No.: 14/544,268

(22) Filed: Dec. 15, 2014

(65) Prior Publication Data
US 2018/0007838 A1 Jan. 11, 2018

(51) Int. Cl.
*A01G 7/04* (2006.01)
*H05B 45/20* (2020.01)
(Continued)

(52) U.S. Cl.
CPC ........... *A01G 7/045* (2013.01); *H05B 45/20* (2020.01); *H05B 47/16* (2020.01); *H05B 47/19* (2020.01); *Y02B 20/40* (2013.01); *Y02P 60/14* (2015.11)

(58) Field of Classification Search
USPC ........................................ 47/58.1 LS, DIG. 6
See application file for complete search history.

(56) References Cited

U.S. PATENT DOCUMENTS 6,459,919 B1 * 10/2002 Lys ................. F21S 4/28
600/407
7,617,057 B2 11/2009 May et al.
(Continued)

FOREIGN PATENT DOCUMENTS

EP 2129212 B1 1/2016
WO WO 2018/204539 A1 11/2018
WO WO 2020/219832 A1 10/2020

OTHER PUBLICATIONS

Folta and Maruhnich, "Green light: a signal to slow down or stop," Journal of Experimental Botany, 2007, vol. 58, No. 12, pp. 3099-3111.
(Continued)

*Primary Examiner* — Andrea M Valenti
(74) *Attorney, Agent, or Firm* — Cooley LLP

(57) ABSTRACT

Plants are optimally grown under artificial narrowband Photosynthetically Active Radiation ("PAR") of multiple colors, and color palettes, applied in but partially time-overlapping cycles. As well as a long, growing season, cycle, the colored lights are cyclically applied on a short, diurnal, cycle that often roughly simulates a peak-season sunny day at the earth latitude native to the plant. Bluer lights are applied commencing before redder lights, and are likewise terminated before the redder lights. Infrared light in particular, is preferably first applied at a time corresponding to early afternoon, and is temporally extended past a time corresponding to sunset. The colored lights and light palettes preferably rise to, and fall from, different peak intensities over periods from 10 minutes to 2 hours, and relative peak intensities of even such different colors as are used at all vary up to times two (×2) in response to differing PAR requirements of different plants. Computer-controlled colored LED lights realize all.

7 Claims, 7 Drawing Sheets

(51) Int. Cl.
*H05B 47/16* (2020.01)
*H05B 47/19* (2020.01)

(56) References Cited

U.S. PATENT DOCUMENTS

| | | | |
|---|---|---|---|
| 8,297,782 B2 | 10/2012 | Bafetti et al. | |
| 8,505,237 B2 * | 8/2013 | Vitale | C08K 5/0041 |
| | | | 47/58.1 R |
| 8,579,465 B2 | 11/2013 | Yamada et al. | |
| 8,668,350 B2 | 3/2014 | Wells et al. | |
| 8,738,160 B2 * | 5/2014 | Bucove | A01G 9/249 |
| | | | 700/90 |
| 8,847,514 B1 * | 9/2014 | Reynoso | H05B 47/19 |
| | | | 315/307 |
| 9,310,027 B2 | 4/2016 | Wells | |
| 9,310,049 B2 | 4/2016 | Wells | |
| 9,986,621 B2 | 5/2018 | Wells | |
| 10,512,221 B2 | 12/2019 | Wells | |
| 10,544,904 B2 | 1/2020 | Wells | |
| 10,602,669 B2 * | 3/2020 | McCord | A01G 7/045 |
| 10,612,726 B2 | 4/2020 | Wells | |
| 10,652,969 B2 | 5/2020 | Wells | |
| 10,660,170 B2 | 5/2020 | Wells | |
| 2003/0009933 A1 * | 1/2003 | Yoneda | A01G 7/045 |
| | | | 47/1.01 R |
| 2004/0109302 A1 | 6/2004 | Yoneda et al. | |
| 2009/0323321 A1 * | 12/2009 | Paolini | H05B 47/175 |
| | | | 362/231 |
| 2010/0020536 A1 * | 1/2010 | Bafetti | A01G 9/249 |
| | | | 362/231 |
| 2011/0062873 A1 * | 3/2011 | Gall | H05B 45/28 |
| | | | 315/153 |
| 2013/0139437 A1 * | 6/2013 | Maxik | H05B 45/22 |
| | | | 47/58.1 LS |
| 2013/0293156 A1 | 11/2013 | Wells | |
| 2014/0165462 A1 * | 6/2014 | Shigyo | C12N 1/12 |
| | | | 47/58.1 LS |
| 2015/0061510 A1 * | 3/2015 | Maxik | H05B 47/10 |
| | | | 315/153 |
| 2015/0128490 A1 * | 5/2015 | Aikala | F21K 9/64 |
| | | | 47/58.1 LS |
| 2015/0150195 A1 | 6/2015 | Grajcar | |
| 2015/0216130 A1 | 8/2015 | Grajcar et al. | |
| 2015/0250106 A1 * | 9/2015 | Wik | H05B 45/20 |
| | | | 47/58.1 LS |
| 2016/0007424 A1 | 1/2016 | Maxik et al. | |
| 2016/0007543 A1 * | 1/2016 | Takashima | A01G 22/15 |
| | | | 47/58.1 LS |
| 2017/0034895 A1 | 2/2017 | Vogel | |
| 2017/0245440 A1 | 8/2017 | Cho et al. | |
| 2018/0116127 A1 | 5/2018 | Krijn et al. | |
| 2018/0242539 A1 | 8/2018 | Bhattacharya et al. | |
| 2018/0352755 A1 | 12/2018 | Szoradi et al. | |
| 2019/0264893 A9 | 8/2019 | Wells | |
| 2020/0077598 A1 | 3/2020 | Wells | |
| 2020/0158293 A1 | 5/2020 | Wells | |
| 2020/0214225 A1 | 7/2020 | Wells | |
| 2020/0267823 A1 | 8/2020 | Wells | |
| 2020/0288555 A1 | 9/2020 | Wells | |

OTHER PUBLICATIONS

Folta et al., "Design and fabrication of adjustable red-green-blue LED light arrays for plant research," BMC Plant Biology 2005, 5:17, 11 pages.

Urbonavičiūtė et al., "Effect of short-wavelength light on lettuce growth and nutritional quality," Lithuanian Institute of Horticulture, 2007 26(1): 157-165.

Wang et al., "A new principle photosynthesis capacity biosensor based on quantitative measurement of delayed fluorescence in vivo," Biosensors and Bioelectronics, Jun. 2007, vol. 22, Issue 12, pp. 2861-2868.

* cited by examiner

| Channel | Name | LED Chips |
|---------|------|-----------|
| 1 | White | 20x 4000-6000K |
| 2 | Ultra Red | 40x 660-670nm |
| 3 | Aqua Blue | 8x 450-455nm, 12x 470-480nm |

| Channel | Name | LED Chips |
|---|---|---|
| 1 | Red | 20x 640-660nm |
| 2 | Ultra Blue | 16x 410-420nm, 24x 435-445nm |
| 3 | Gold Orange | 12x 585-595nm, 8x 620-630nm |

| Channel | Name | LED Chips |
|---|---|---|
| 1 | Green | 20x 520-530nm |
| 2 | Ultraviolet | 16x 360-370nm, 24x 380-390nm |
| 3 | Far Red | 20x 725-735nm |

MULTIPLE COLORS, AND COLOR PALETTES, OF NARROWBAND PHOTOSYNTHETICALLY ACTIVE RADIATION (PAR) TIME-STAGED OVER HOURS, DAYS, AND GROWING SEASONS YIELDS SUPERIOR PLANT GROWTH

BACKGROUND OF THE INVENTION

1. Field of the Invention

The present invention generally concerns the optimization of artificial Photosynthetically Active Radiation ("PAR") which, if applied to plants, will speedily produce mature healthy plants at minimum energy cost.

The present invention particularly concerns a system wherein artificial PAR applied to grow plants is periodically varied in color on a period shorter than two days, and most commonly both hourly and diurnally (daily), in order to promote plant growth.

2. Background of the Invention

2.1 Photosynthetically Active Radiation ("PAR")

In his treatise "SPECTRAL COMPOSITION OF LIGHT AND GROWING OF PLANTS IN CONTROLLED ENVIRONMENTS" appearing in International Lighting in Controlled Environments Workshop, T. W. Tibbitts (editor) 1994, Russian author Alexander A. Tikhomirov says: "I do not believe that we have to copy illumination of plants in natural conditions for use in controlled environment growing", giving the example of "there's no need to grow some species of plants under alternative light dark periods . . . [where] our research showed that productivity of some plants (radish, wheat) can be increased under continuous irradiation" (Citing Tikhomirov et al., 1976; Lisovsky et al., 1987).

Tikhomirov makes this statement after discussing (1) the photosynthetic rates of different plants, (2) differently aged plants, (3) different portions of plants, (4) plants of differing sensitivity to Photosynthetically Active Radiation ("PAR"), (i.e. cucumbers and sunflowers will not grow but under PAR of suitable intensity and wavelength, whereas tomatoes and wheat are capable of producing a harvest irrespective of the PAR spectrum and intensity provided), for differing PAR irradiance.

But Tikhomirov, and all the learned authors he cites, and the entire field of composing light(s) of a certain spectral composition in order to realize optimal plant growth (in a controlled environment), do not seem to recognize certain truths uncovered by the inventors.

First, since the PAR spectrum of absorption for green leaved plants (on average), and for particular individual plants, are well known, it has been thought that the spectrum of PAR provided to a plant should be in accordance with the spectrum of irradiance which the plant absorbs. (It is recognized that this may vary over time with the age of the plant, and that the optimal PAR can be different for the top leaves of the plant and the under-leaves.) Since some plants can, to some degree, adopt to the PAR radiation that they receive, growing in a manner to use more of what spectrum and intensity of irradiance is available, what could be more logical than to supply the plant with PAR that matches its preferred absorption? And this is what the prior art teaches to do.

However, this approach of supplying all the light, and those colors and intensities of light, that the plant can absorb, is not correct. As the present and related applications will show, (1) although most plants can tolerate all wavelengths, the plant but poorly uses certain wavelengths of PAR, and does not need these wavelength at all; (2) although the plant can, and does under the sun, tolerate continue illumination including at those selected PAR wavelengths it prefers, the plant cannot effectively use millisecond to millisecond continuous illumination at these wavelengths, and, as the subject of the instant disclosure, (3) although plants can tolerate crude "synthetic daylight" (synthetic PAR), many plants much prefer PAR that, in some manner, PAR that replicates each of the (a) timing and (b) colors of the diurnal lighting normal to the earthly locations (in latitude, altitude, prevailing weather patterns, etc. etc.) in which the plant is normally grown.

As far as PAR goes, the present invention and related inventions teach that plants are "picky eaters". This is evident in that even the most efficient plants turn only but somewhere in the range of 5% of the light energy that they receive into biomass. This inefficiency may have been thought to be a possibly inevitable consequence of inefficiencies in the photochemical, and chemical, processes of the plant. Call it what you will, the present and related inventions teach that most plants simply do not act on 90% of the radiation energy (PAR) that they receive.

2.2 Use of Light Emitting Diodes (LEDs) as Growth Lights for Plants

Light Emitting Diodes, or LEDs, respond instantly when power is applied. A greater electrical force can be used if the electricity is pulsed at a very high rate rather than driving it with a steady current this is called the duty cycle of the LED. Pulsed LEDs can appear brighter to the human eye because the period of darkness changes to fast for us to see. Considering now the photosynthetic process takes less than one trillionth of a second you can establish any pulsing will and does affect growth. Most previous LED-based "grow lights" emit a constant and consistent stream of usable light.

Light Emitting Diodes (LEDs) have known advantages for use in greenhouses. They produce (1) lower heat output, permitting proximity to plants, at (2) highly selectable wavelengths (i.e., colors). They (3) offer lower cost of use, (4) longer life than incandescent lighting, (5) compact device size, and (6) flexible design options for horizontal or vertical lighting and for moving fixtures. They offer (7) potentially higher quantum efficiency.

2.3 The Observed Growth of Plants Over Time

The present invention will be seen to be based upon photographic observations of the growth over time. It is not unknown to so observe plants, including so as to scientifically assess what makes plants grow best. For example, in the article "Spatio-temporal dynamics of expansion growth in roots: automatic quantification of diurnal course and temperature response by digital image sequence processing: by A. Walter, et. Al., appearing in the Journal of Experimental Botany Volume 53, Issue 369 pp. 689-698, it is explained that "A newly developed technique based on image sequence analysis allows automatic and precise quantification of the dynamics of the growth velocity of the root tip, the distribution of expansion growth rates along the entire growth zone and the oscillation frequencies of the root tip during growth without the need of artificial landmarks.

These three major parameters characterizing expansion growth of primary roots can be analyzed over several days with high spatial (50 i·tm) and temporal resolution (several minutes) as the camera follows the growing root by an image-controlled root tracking device.

In combination with a rhizotron set up for hydroponic plant cultivation the impact of rapid changes of environmental factors can be assessed. First applications of this new system proved the absence of diurnal variation of root growth in Zea mays under constant temperature conditions. The distribution profile of relative elemental growth rate (REGR) showed two maxima under constant and varying growth conditions. Lateral oscillatory movements of growing root tips were present even under constant environmental conditions. Dynamic changes in velocity- and REGR-distribution within 1 h could be quantified after a step change in temperature from 21° C. to 26° C. Most prominent growth responses were found in the zone of maximal root elongation."

The inventors have been unable to locate any analogous experiments assessing diurnal variation in the growth of plants with variation in the color(s) of PAR applied to grow the plant. There are several possible reasons for any dearth of scientific research in the area. First, until the recent availability of colored LEDs, most light generated for application to plants as PAR was broad-spectrum, such as is efficiently produced by a plasma light source. Second, since it is known that most plants will successfully grow under continuous, 24/7, illumination (as discussed in previous section 2.1), why would it be thought that the plant desires anything different, or other, than "high noon" illumination, and all of that illumination that it can get? Third, it is known that plants will more efficiently use various color PAR—most particularly blue light for growth and red light for the maturation of fruits—throughout their multi-week and multi-month, growing season(s), but why would a mere plant be thought to be "picky" about the color(s) of the radiation (light) that it receives during the course of but a single day? The plant might reasonably be thought not to desire PAR that is too intense, and that "burns" the leaves of the plant, but since the plant has no control of the color(s) of the sunlight that it receives upon the surface of the planet earth, why would the plant be though to develop diurnal "preferences" for "colors" that are, essentially, completely out of its control?

2.4 Plants are "Picky Eaters" when it Comes to PAR

The present and related inventions will be seen to collectively show that, quite unexpected, plants are "picky eaters" as regards PAR, and that—has long been known, but not how nor why—they "waste" a lot of the energy that is within the radiation that falls upon them. Since the plant has no intelligence, nor volition, the inventors attribute this action to the chemistry going on inside the plant, and maintain that in the compound word "photo-chemistry" as describes what goes on inside a plant, the overwhelming emphasis must be given to the word "chemistry". Although the present and related inventions teach "photo", or the nature of the light that is most efficiently applied to grow the plant, the "photo" that is best and most effectively applied is—in the opinion of the inventors—driven by the "chemistry" of green plants.

Namely, the related patent application for NARROWBAND PHOTOSYNTHETICALLY ACTIVE RADIATION ("PAR") SUBSTANTIALLY ONLY AT EACH OF MULTIPLE EMISSION WAVELENGTHS YIELDS GOOD PHOTOSYNTHESIS AT REDUCED ENERGY COST shows that plants substantially waste most of such radiation (and its energy) that they receive save that such radiation is within narrow wavelength bands where it best serves to initiate the photochemical processes of the plant: chlorophyll A, chlorophyll B, beta carotene and a few other reactions (as may vary in importance between plant species).

Namely, in the related patent application for CONTROL, INCLUDING LOW-DUTY-CYCLE KILOHERTZ MODULATION, OF EACH AND ANY OF THE CONTINUITY, DUTY CYCLE, INTENSITY AND PERSISTENCE OF PHOTOSYNTHETICALLY ACTIVE RADIATION ("PAR"), INCLUDING NARROWBAND PAR AT EACH OF MULTIPLE WAVELENGTHS, YIELDS GOOD PHOTOSYNTHESIS AT REDUCED ENERGY COST it is shown that, even at the proper wavelength(s), the plant may waste considerable of any light (PAR) energy received continuously millisecond-to-millisecond because, it is hypothesized, the ion transport channels of the plant become "clogged".

Now comes the present invention that strongly suggests that an earth plant has an internal cycle related to an earth day. The meaning, and cause, of this is unknown, but a green plant may be upon some sort of internal diurnal "schedule" to move materials around inside the plant, e.g. water and nutrients from the roots to the leaves, and nutrients to build cell mass to the ripening fruits.

As with the related two inventions and applications, this observation is of practical, as well as philosophical, importance. It will not be desirable to use electric energy to generate PAR of wavelengths or intensities that, when applied to the plant at certain portions of the day, the plant does not appreciably want, nor appreciably use. Instead, it is much more efficient to give the plant the PAR that it then wants, and can then use.

2.5 Plant Volatiles Known to Affect Aroma and Flavor are Affected by Light Treatment The present invention will be seen to teach how to apply in a sophisticated, computer-controlled customized way—any of many—ten and more—different spectrums of light at any time or times of the days, weeks, and months growing season in order to grown plants. One example of the effective use of such complex lighting is explained in the paper "Light modulation of volatile organic compounds from petunia flowers and select fruits" by Thomas A. Colquhouna, Michael L. Schwietermanc, Jessica L. Gilbertb, Elizabeth A. Jaworskia, Kelly M. Langera, Correy R. Jonesa, Gabrielle V. Rushinga, Tia M. Huntera, James Olmstead, David G. Clarka, and Kevin M. Foltab, appearing in Postharvest Biology and Technology, Volume 86, December 2013, Pages 37-44. This paper discusses and teaches (1) testing the effect of narrow-bandwidth lighting on plant volatile emission; (2) volatiles known to affect aroma and flavor are affected by light treatment; (3) petunia flowers show strong effects of light treatment in volatile emission; (4) specific volatiles respond differently in strawberry and tomato; and (5) the methods suggest light may be used to control flavor and aroma.

More specifically, this paper describes that "[flight intensity, duration, direction, and wavelength are informative to plants. The biochemical circuits that connect specific light wavelengths to expression of specific genes and the metabolic networks they govern have been well defined. However, little emphasis has been placed on how discrete wavelengths of light, alone or in combination, may be applied to manipulate post-harvest qualities of high-value horticultural crops. Using narrow-bandwidth LED light we test the hypothesis that discrete light wavelengths can affect the accumulation of volatile compounds known to affect aroma or taste in select flower and fruit products. Volatile benzenoid/phenylpropanoid emission from petunia flowers could be altered with light application. Levels of a key floral volatile, 2-phenylethanol, increased with a red and far-red light treatment. Similar experiments demonstrated that fruit volatile profiles of tomato, strawberry, and blueberry can be manipulated with specific light treatments. These results suggest that compounds affecting sensory qualities of flowers and fruits can be modified by adjustment of ambient light conditions. These findings open new areas of inquiry about how the fragrance and flavor of flowers and fruits may be improved with simple changes in post-harvest light conditions."

2.6 Light Spectrums for Plant Growth May be Manipulated in Accordance with any of Day/Night Cycles, Seasonal Cycles, Competitive Signals and Harsh Condition Preparedness of Plants The present invention will be seen to teach the sophisticated, computer-controlled, application of as many as ten different light spectrums, each on a periodic (cyclical) and phased relationship, to control the growth of plants. An early attempt to apply different light spectrums to plants in accordance with any of day/night cycles, seasonal cycles, competitive signals and harsh condition preparedness of the plants is described in U.S. Pat. No. 8,738,160 for an "Apparatus and method for plant metabolism manipulation using spectral output".

This patent describes "[a] method and apparatus for metabolism manipulation of life forms using spectral output which comprises at least one array of LED light sources which have metabolic manipulating spectral emissions. The array sends one or more environmental signals selected from the group consisting of day/night cycles, seasonal cycles, competitive signals and harsh condition preparedness. A remotely programmable microcontroller is operatively connected to the at least one array for controlling the spectral emissions in a desired manner. The microcontroller selectively sending on commands, off commands and intensity commands to the at least one array. The method and apparatus include software for driving the microcontroller and the software is stored in a memory. A power source is operatively connected to the at least one array of LED light sources, and a graphic user interface facilitates inputting information, by an operator."

Although embracing the ideas of (1) computer-controlled (2) light spectrums (3) periodically applied, the '160 patent suffers from teaching little more than application of (A) blue light(s) in the morning and red light(s) in the evening (to match the solar day), and/or (B) blue light(s) at the start of a growing season for germination and growth, and red light(s) at the end of the growing season for fruiting and for maturation. The present invention will be seen to teach a rather more sophisticated application of more, and more versatile, light spectrums over both diurnal (i.e., daily) and seasonal growing periods.

2.7 Terminology

In this specification and those of the related applications the term "wavelength" is used exclusively in description of the color of the generated and applied PAR. This "wavelength" is then, by the laws of physics, then number "1" over the "frequency" of the applied PAR. However, the word "frequency" is not used in description of the color of the applied PAR in the related patent applications, nor in this patent application.

In the specification of the present and related applications the word "frequency" is reserved for another purpose: namely, any rate at which the applied PAR, or any component of it, is modulated, including 100%, "ON" and "OFF", modulation. This absence of the word "frequency" in description of the color of the applied PAR, and its use to instead describe a modulation of the PAR, will be important in the present specification; and this use (non-use) of the word "frequency" in the present application is consistent with the related patent applications.

SUMMARY OF THE INVENTION

1. Relation Between the Present and Related Inventions

A related invention, and patent application, for NARROWBAND PHOTOSYNTHETICALLY ACTIVE RADIATION ("PAR") SUBSTANTIALLY ONLY AT EACH OF MULTIPLE EMISSION WAVELENGTHS YIELDS GOOD PHOTOSYNTHESIS AT REDUCED ENERGY COST shows that artificial Photosynthetically Active Radiation ("PAR") best used to grow plans is not substantially identical that the radiation that the plant absorbs (and does not reflect)—as has been thought—but is instead best isolated to certain narrow wavelength bands. These narrowband radiations are appropriate in wavelength and intensity to the particular photochemical processes of the plant, for example chlorophyll A, chlorophyll B, beta carotene and a few other reactions (as may vary in importance between plant species). In the related application some 4 to 15, and preferably about 10, narrow bands of PAR each at an associated wavelength between infrared and ultraviolet are identified. PAR of wavelengths outside these narrow bands is ¬any of (1) less effective, or (2) substantially ineffective to induce plant growth, and may, indeed (3) be substantially wasted if applied, along with any electrical energy used to produce PAR.

The present invention shows how to apply the spectrally-energy-efficient PAR (at the multiple narrow bands) in (1) time and in (2) intensity (illumination flux). The number of narrow bands is most preferably about nine (9). The narrow bands are not—as they can be and as is taught in the related application—extremely narrow—perhaps with 50%+ or even 90% of the energy within a band of only 10 nm. Full Width Half Maximum (FWHM). (FWHM means that width of the wavelength interval between that point upon the ascending portion of the emission intensity curve of the emitter, and a comparable point on the descending portion of the emission intensity curve of the same emitter, that are each at one-half the maximum intensity of the emitter,)

Instead, the nine (9) preferred bands of PAR in accordance with the present invention are still narrow but are somewhat widened into what are called "color palettes"—each with an associated color name. These "color palettes" are as narrow as some 50-60 nanometers in bandwidth essentially containing but one PAR wavelength, but a few "color palettes" contain two PAR wavelengths spanning some 70-75 nanometers Full Width Half Maximum (FWHM), and one "color palette" contains plural PAR wavelengths spanning some 95 nanometers FWHM. However, when it is recognized that the composite PAR spans from 340 milometers to 760 nanometers wavelength, or a range of some 460 nanometers Full Width Half Maximum (FWHM), it will be understood that nine "color palettes" collectively spanning only about 200 nanometers wavelength that (and which will be seen preferably to be concentrated even within the narrow bands), it will be understood that the present application, like the related applications, continues to teach that artificial PAR should best be, and be applied, narrowband at a multiplicity of wavelengths for best plant growth. To supply artificial PAR at other wavelengths is sub-optimal at best, and counterproductive to plant growth and wasteful of energy at worse.

This concept is crucial: without understanding it the multiple narrowband palettes of the present invention look to be but arbitrary, and capricious, in their numbers and/or their variations. The inventor cannot be held responsible that plants like a "diet" of PAR that perhaps looks "peculiar" to a human, and, indeed as is taught by the present invention, plants even like different portions of this par not only across a growing season from germination to fruiting, but also within the course of a single day.

The slightly broadened narrowband "color palettes" are not so broadened because the photochemical processes of the plant(s) have changed, nor because each such process is best associated with a particular wavelength of applied artificial PAR. It has more to do with (1) the ready and convenient application of artificial PAR light, and/or (2) replication of Rayleigh scattering in earth's atmosphere, as will be explained.

In particular, the present invention teaches not only that PAR is preferably partitioned into multiple narrow bands (nominally 7 or 9 such bands, or color palettes) but that (1) the different narrow bands of PAR are suitably and desirably diurnally applied to grow plants (2) not only at different relative intensities (flux), but also (3) at different absolute intensities throughout the day, and (4) in different time relationship, or phase, relative to one another. These four (4) distinct concepts may initially be hard to simultaneously carry in one's mind. The reader should perhaps come back to consider the second preceding sentence after observing an exemplary most preferred applied PAR color and intensity spectrum in FIG. 2 hereinafter discussed.

A second related patent application for the CONTROL, INCLUDING LOW-DUTY-CYCLE KILOHERTZ MODULATION, OF EACH AND ANY OF THE CONTINUITY, DUTY CYCLE, INTENSITY AND PERSISTENCE OF PHOTOSYNTHETICALLY ACTIVE RADIATION ("PAR"), INCLUDING NARROWBAND PAR AT EACH OF MULTIPLE WAVELENGTHS, YIELDS GOOD PHOTOSYNTHESIS AT REDUCED ENERGY COST teaches that, even at the proper narrowband wavelength(s) (per the first related patent application), and even when these narrowband wavelengths at proper times throughout the day in proper phased relationship(s) at proper relative intensities, artificial PAR (or at least some of the narrowband artificial) need not be continuously so applied on a millisecond-to-millisecond basis.

There will be found to be strong echoes of this in the present invention, where it is taught that, in undergoing a process called phytochromic recycling, a plant can continue certain growth processes even after the associated (narrowband) light(s) that fostered these processes in the first place is turned "OFF". The strategy evoked by the related invention (at a millisecond duration, kilohertz frequency narrowband PAR illumination), and by the present invention (during illumination with PAR over a diurnal period) are the same, and are straightforwardly rational. If the plant does not use at certain times some applied, narrowband, PAR—and, indeed, may actually suffer from continued application of this (selective, narrowband) PAR at times that it is unused and/or unwanted—then why force the (narrowband, or any broadband containing the narrowband) PAR onto the plant? Instead simply turn such entire artificial PAR as proves useless (or worse) at certain times—as well as turning certain wavelengths—"OFF"—and save the electrical energy of its unnecessary generation.

All three related inventions are usable independently. All are usable to good benefit in indoor growing as measured by (1) shortened grow times from crop seed germination to harvest, (2) improved crop yield volumes and weights, and (3) superior crop quality. All three inventions independently show how to independently significantly reduce the (electrical) energy requirement for the generation of artificial PAR radiation. Collectively the three inventions show how to produce a superior PAR for growing at, most typically for most plants, less than half the normal electrical energy requirement regardless of the lighting technology (e.g., LEDs) that is used.

In further summary, the three related inventions show that earth plants are very sophisticated and discriminating consumers of PAR in heretofore unrecognized, and non-trivial, and unsuspected, ways. The related inventions teach that the best artificial PAR gives the plants what they want, howsoever arbitrary and capricious these plant preferences may be. The absorption, and the use, of PAR by plants has been studied a long time without—to the inventor's best knowledge—recognition of the phenomena that are the subject of the present and of the related patent applications. Perhaps this is because that it has only been with the modern availability of narrowband LED light sources of suitable intensity for growing that sophisticated artificial PAR has been susceptible of being generated, permitting that the response of plants to the many possible variables in the artificial PAR could be recognized. Perhaps also even more than narrowband illumination (at a multiplicity of frequencies) as may be realized by LEDs has been needed: it is likely mandatory to invoke automated computer control of both (LED) lights ON/OFF and intensity—as is taught by the present invention—before the sophistication and discrimination of plants in their consumption of PAR could come to be understood.

2. Optimal Artificial PAR is Diurnal (for Most Plants), and Sophisticated

The present application is based on experimental observation of the growth of plants that were exposed to (1) multiple narrow bands—colors, and color palettes—of Photosynthetically Active Radiation ("PAR") on (2) but partially time-overlapping cycles of hours, and of days. The cycles for applying all of many colors, or color palettes, of variously-colored lights were (1) individually staged (i.e., sequenced), (2) phased relative to one another, and (3) of individually controllable, different, durations.

Despite the possibility of extreme variations in the temporal application of narrowband (i.e., colored) PAR for growing, research showed that various colors of PAR are most preferably set to two identical-duration (1) master cycles: a (1a) short cycle of a duration of no longer than two days nor shorter than two hours, and most preferably of one day (24 hour) duration; and a (1 b) long cycle of the duration of an entire growing season, most commonly ranging to weeks and months. [Note that the previous sentence says" "various colors of PAR". One of the related inventions teaches that all PAR—clearly of all colors—should be turned ON and OFF at millisecond rates. The reader can consider this to be yet another "master cycle" if he or she so chooses, but it seems to stand clear of the "master cycles" of "colors" now being discussed as being due to another photochemical mechanism in the plants.]

Variations in the color(s) of applied PAR at the (1b) long cycle is at least crudely already known, with predominantly blue light typically being applied at the beginning of the growing season to induce sprouting and the growth of plant mass, and with predominantly red light typically being applied at the end of the growing season to induce seed growth and/or fruit maturation and ripening. This (1b) long cycle in PAR for growing the present specification does not teach, and the inventors do not claim. The present invention simply shows that this (1b) long cycle may beneficially be smoother and more progressive, and/or customized to a particular plant that is being grown.

However, and arguably surprisingly, the present invention now teaches that the color(s) of applied PAR should also be varied on a (1a) short duration cycle that can be daily (diurnal), or longer, but that can also be shorter and much shorter than a day (24 hours), and down to a duration of as little as two hours. Since application of grow lights to some plants is again already known to be at least crudely varied— lights "ON" and lights "OFF"—to some plants (but not to others!) on daily basis, an analogy may be useful a this point to better understand the present invention. It is widely known that when animals, including humans, are deprived of all reference to the passage of time, such as in isolation from natural sunlight, then their natural bodily cycles lengthen from 24 to 25 and even to 26 hours and more. Humans in environmental isolation never naturally assume a shorter day. Even when time scheduling is "artificial" such in the scheduling of watches onboard ships, the master period is maintained at 24 hours of some multiple thereof, and no ship at sea operates on a "day" of 23 hours.

Not so plants. Plants can indeed grow in a "stretched" day, unlike animals. However, plants can somehow accommodate a shortened "day" of 23 and less hours. Why plants and animals—both evolved on planet Earth—differ in this regard is not known by the inventors.

Although plants can grow on a foreshortened "day" enough is not yet known, alas, by the inventors about plant growth at accelerated rates so as to warrant changing the "growing day" of plants to 23 or to 22 or to even fewer hours in order to accelerate the real time growth of the plant. However, it looks as if plants indigenous to high latitudes that can grow in natural conditions with both 16 hours sunshine/8 hours darkness in local summer, and with 8 hours darkness/16 hours sunlight in local winter (and few plants can), or, alternatively, with 16 hours artificial PAR/7 hours darkness, in a "23 hour grow day". If the number of "grow days" N in the plant growing season remains constant, this variation in the "grow day" taken alone clearly improves productivity of artificial growing by 1/24, or more than 4%. Nonetheless to this interesting discovery, it is not the gravamen of the present invention.

Still further in the present invention, and arguably more importantly, the present invention contemplates that PAR should optimally be applied for the optimal of many common plants at (1) multiple colors for (2) each of which the (2a) timing of onset and cessation—ergo (2b) the duration— and (2c) the intensity, can be, and for each of most of the multiple colors for most of the plants, should be, (3) independently phased. The preceding sentence, with its complex punctuation, says a lot. It may be hard to understand. The inventors cannot be held responsible that plants should have sophisticated preferences in the use of PAR colors that are hard to come to knowledge of, and, once known, are harder still to satisfy. However, when reference is made to the drawings wherein an exemplary optimal PAR spectrum is shown, then all these terms including "multiple colors", "timing", "duration", "intensity" and "phasing" will be better understood.

First, in accordance with the present invention, all of a sudden applied artificial PAR—which had been thought to be either "ON" or "OFF"—is broken into multiple colors, or "color palettes". Some, and typically most, ones of these "color palettes" are of (1) independent time of onset and time of cessation—ergo, duration—and (2) intensity. Finally, the multiple colors are (3) related one to another, or phased, in some of all of these time-based criteria.

The situation may seem confusing to the reader. There may seem to be too many variables. Are plants, and nature, really this complex? Optimal PAR for growing may easily be appreciated to require multiple colors of the spectrum, but should these colors be cycled in intensity at independent durations and intensities in some sort of phased relationship? According to the present invention, he answer is "yes".

Luckily, the most preferred, and superior, (2) phasing (for most plants) has been found to in some degree replicate—as will be explained—the normal solar cycle during the growing season of the plant at those latitudes to which the plant is native. This color- and intensity-phasing has been found to best replicate the (2a) solar day, including both sunrise and sunset.

But, as a much more difficult idea to grasp, the color- and intensity-phasing has also been found to best replicate the (3) variation in intensity and color of natural sunlight delivered to the plant over the course of its growing season depending upon the differing angular attitude of the sun in the sky at the natural latitude of the plant over said growing season. Due to the Rayleigh scattering of sunlight in the atmosphere there will be relatively greater blue light intensity, and relatively less red light intensity, when the sun is near to the horizon. The reader is now being asked to consider not only sunrise and sunset, but the movement of the sun along the ecliptic. A plant with a growing season spanning both sides of the summer equinox will enjoy relatively more blue light when it sprouts in spring, and again when it matures in the fall. A maximum percentage of red light will delivered to a plant at the equinox. This also the present invention teaches to replicate.

In simplest terms, the present invention teaches "diurnal variation" in the application of PAR to grow plants with a capital "D" diurnal, and a capital "V" variation. The diurnally variant PAR of the present invention is not simply a broadband light that is "ON" in the morning, and "OFF" at night. The present invention is not even a bunch of narrowband colored lights that are "ON" in the morning, and "OFF" at night. Although based on straightforward principles often replicated in nature, the present invention teaches a very sophisticated cyclically phased application of colored narrowband PAR for growing, the base period of which is nominally chosen to be diurnal, or daily, or 24 hours.

Over billions of years of evolution on earth plants have somehow become finely attuned to solar conditions in the latitudes in which they have evolved. It is prima facie obvious that plants in temperate zones undergo a growing season in response to the sun. What is less obvious, and taught by the present invention, is that plants did not stop their evolutionary sensitivity to sunlight conditions with the (relatively long) growing season, but have evolved a sensitivity to the natural variation in sunlight over but a single day! According that many plants—nonetheless to being possible of being grown under lighting that is distinctly non-natural—seem to grow best under at least some of the (sun)lighting conditions that they experience in nature in but one single day, the present invention teaches to "give the plants the PAR that they seem to want" even if only over but a short period of hours.

3. What does it Matter that a "Complex" PAR of Different Colors should be Applied in a "Complex" Manner to Grow Plants?

Not all colors, color intervals and durations, color phasing, color intensities, and color cycle periods could be tested and observed by the inventors for any one plant, let alone for all plants. All these factors seem to vary, and sometimes unexpectedly vary greatly, between different plants.

However, such color variations as have been recognized, and studied, make for significant differences in plant growth: as much as, by way of example, the difference between (1) 90 grams plant mass and (2) 270 grams plant mass for plants respectively grown under (1) broad spectrum, and under (2) phased selective narrowband colored, lights having equal light intensity (i.e., lumens) to the broadband lighting in those portions of the PAR spectrum whereat the narrowband sources provide light. It is suggested that, because the energy consumption of both these alternatives for generating PAR can be made to be roughly equal using the same technology, then this nearly three times (×3) difference in yield is worth paying attention to.

Accordingly, it is useful to "feed" the plant on a daily basis (only) those colored lights—PAR—that it can best use at (only) those times when the plant can so best use each light color—even if, as a practical matter, this is easier said than done. The present and related inventions not only teach how to deliver this PAR but, in a closed-loop feedback system, how to determine the characteristics of the PAR that is optimally delivered.

Ongoing investigations into the considerable complexity of optimal, and optimally-colored, artificial PAR for growth of all plants cannot be spread over a similar ten thousand year plus (10,000+ year) period during which the human race has developed knowledge of, and, where possible, responses to, outdoor agricultural growing conditions. Instead, spectrum-specific (i.e., color-specific), no-turnon/turnoff-energy-loss, LED lighting now for the first time effectively permits humans to choose the "sunlight" that is applied to grow plants. An energy-short and hungry world cannot wait 10,000 years to figure out the best artificial PAR to best grow diverse plants, each with a minimum energy expenditure.

Automation of (1) control of plant growth conditions, and in (2) the collection of real-world plant growth results responsive to the growing conditions applied, is the obvious answer to figuring out how to optimize the growth, and the energy-efficient growth, of diverse plants. And this growth data and analysis is desirably accomplished within a span of decades, and not centuries nor millennia. The present and related inventions will be seen to show how to controllably, and the flexibly, control one important—and highly variable—part of plant growth conditions: the colors of the PAR applied to grow the plant, and when and in what staged (phased) relationship(s) these multiple colors of PAR are so applied.

In short: (1) PAR matters; and (2) optimal artificial PAR is sophisticated, and variable between plants. Accordingly, (3) the present and related inventions teach the apparatus, and the method, by which optimal PAR (for any specific plant) may be expeditiously determined.

4. Does a Plant want an Applied Artificial PAR of Optimal Colors that is Simple? or that is Complex?

Time lapse photography by the inventors of plant growth under artificial growing conditions specifically including artificial PAR of multiple colors has revealed that plants will obtain not merely equal, but superior growth, when supplied (1) on a daily cycle divided into (2) a first plurality of illumination periods during which the plant is supplied with (3) a second plurality of different colors (preferably administered to the plant as "color palettes" each of which consists of multiple narrowband colors of preset intensity) that, collectively and over time, (4) substantially stimulate—with changes—a sunlit day at those earth latitudes to which the plant is native.

In short, the plant is best, and most energy efficiently, grown with PAR—whether broadband or multiple narrowband—that is—on a daily basis—anything but constant (for whatsoever interval applied). Instead, the plant—which must seemingly use the selfsame photochemical systems at all hours to produce its growth—seems to be any of (1) picky, or (2) perverse, or (3) unlike animals in its daily "diet", and seems to want (for those plant species studied) a rather complex daily PAR.

The overall color spectrum of the applied artificial PAR can be immensely complex. Needless to say, the inventors of the present application deny—tongue in cheek—responsibility for this complexity, and find that they must deal with earth plants as they presently are or can be genetically engineered to be. Indeed, the admixtures, periodicities, relative intensities, and phasings of the multiplicity of colors that are optimally applied to even but a single plant species—being that the optimum PAR for individual plant species differs widely (and more widely than might be expected)—is, in fact, complex. However, the inventors hope to have recognized, and to teach within this specification, certain essential relationships in the spectra of colored lights that are applied as artificial PAR to grow common plants.

Before proceeding to these essential color relationships for artificial PAR, and the lighting system by which they may be realized, a tentative theory is advanced as to why plants so respond. When, in particular, the color complexity of optimal applied PAR will soon found to be very great, and when the following theory as to why things should be this way is arguably found to be but speculative, then the reader may, while admitting that the present specification teaches optimal mid-growing-season PAR for kale, despair that the present specification should teach optimal PAR for growing, say, lettuce. The answers to any such unhappiness are as follows. First, the benefit of the correct PAR correctly applied (in colors, time, intensity and phase) is very great. Preliminary experience with kale indicates that (1) up to three times more plant mass may be grown than with un-optimized PAR of equal energy applied for the same growing season or that, alternatively, (2) a kale crop of equal biomass may be realized in an artificial growing season of one-quarter less duration. Second, the present specification teaches how to derive the answers for optimal PAR for lettuce, and everything else, by (1) starting with the multi-spectral computer-controllable LED light of the present invention, and then (2) proceeding to apply the organizing principles of the present invention hereinafter explained.

5. A Computer-Controlled LED-Based Lighting Apparatus

First, the present invention contemplates a computer-controlled LED-based lighting apparatus by which the times (cycles) and intensities of each of a great multiplicity of (preferably narrowband) colors may be controlled. When "narrowband" is defined as is preferred as: "90% of the light energy being within a bandwidth of 70 or less nanometers" then total number of different colors applied exceeds four (4), and is normally about eight (8) or nine (9) different narrowband colors for the exemplary Kale plant for which exemplary optimum (mid-growing-season) PAR illumination is taught within this specification. Said (1) times and intensities of these nominal 8-9 different (narrowband) colors are preferably individually controlled, and (2) the different colors can be, and preferably are, administered to the plant as "color palette" the number of different "color palettes" equaling about 8-9 for the growing of said Kale, and (3) the number of different (but most often closely related) (narrowband) colors each palette most typically ranging over about 50-60 nanometers bandwidth, but occasionally to 70-75 nanometers Full Width Half Maximum (FWHM), and rarely to 95 nanometers Full Width Half Maximum (FWHM), bandwidth.

The transitions from one color palette within a one period to a next color palette within a next subsequent period may be, and preferably are, gradual and progressive. Likewise, not only are different cycle periods, illumination periods, and color palettes applied over the full duration of a growing season—which might be suggested by prior art emulation of lengthening growing days and intensified infrared lighting intensities towards the end of a growing season—the present invention contemplates (1) smoothly progressing through multiple spectrums between the days of each season, and even (2) varying the plural periods of each growing day, with the color palettes applied upon each of these periods.

Accordingly, the present invention may alternatively be though of as contemplating a computer-controlled LED-based lighting apparatus by which the times (cycles) and intensities of each of a multiplicity of "color palettes" each of one or more different (preferably narrowband) colors may be controlled. The principle is the same (as will become better understood as a most preferred color spectrum is studied): a multiplicity of (preferably narrowband) colors must be staged in application to the plant so as to realize optimal PAR for plant growth.

The purposes of all these variation in the applied PAR are to (1) make that plant grows better, and faster, while (2) saving money, and electricity, by not generating and applying PAR that the plant does not then want, and does not then efficiently use.

6. Independent Diurnal Application of Different Spectra of PAR at and During at Different Time Periods Accordingly, in one of its aspects the present invention is embodied in a method of providing artificial PAR to a plant for growing where, diurnally at and during at least three different time periods at least three different spectra of PAR are delivered to the plant.

These at least three different PAR spectra are drawn from the group consisting of 1) a spectra called "ultraviolet" containing light in a narrow band of wavelengths not broader than 70 nanometers Full Width Half Maximum (FWHM), and including light of 385 nanometers which affects early light-inducible protein, 2) a spectra called "ultra blue" containing light in a narrow band of wavelengths not broader than 75 nanometers Full Width Half Maximum (FWHM), and including light of 420 and 439 nanometers which affects chlorophyll A, alphá carotene, and carotenoids, 3) a spectra called "aqua blue" containing light in a narrow band of wavelengths not broader than 75 nanometers Full Width Half Maximum (FWHM), and including light of 420 and 475 nanometers which affects chlorophyll B, beta carotene, and carotenoids, 4) a spectra called "green" containing light in a narrow band of wavelengths not broader than 50 nanometers Full Width Half Maximum (FWHM), and including light of 525 nanometers which affects $CO_2$ fixation and intermodal distance, 5) a spectra called "gold orange" containing light in a narrow band of wavelengths not broader than 95 nanometers Full Width Half Maximum (FWIEVI), and including light of 590 and 625 nanometers which affects phycoerythrin and phycocyanin, 6) a spectra called "red" containing light in a narrow band of wavelengths not broader than 60 nanometers Full Width Half Maximum (FWHM), and including light of 645 nanometers which affects chlorophyll B, chlorophyll C, and allophycocyanin, 7) a spectra called "ultra red" containing light in a narrow band of wavelengths not broader than 50 nanometers Full Width Half Maximum (FWHM), and including light of 667 nanometers which affects chlorophyll A and phytochrome, and 8) a spectra called "far red" containing light in a narrow band of wavelengths not broader than 50 nanometers Full Width Half Maximum (FWHM), and including light of 735 nanometers which affects chlorophyll D and phytochrome.

There may optionally be a further independent delivery of 9) a spectra called "white" containing broadband light used for plant inspection and maintenance. This "white" spectra is not narrowband, it is not integral to growing, it is of but modest of low intensity, and it may be totally omitted from scheduled application to the plants. It is strictly optional. However, since its intensity is modest, and the physical lights for producing this spectra will already be present within a system exercising the method of the invention, the inventors do not believe that it hurts plant growth to turn in "ON".

The independently diurnally delivered spectra called "ultraviolet" essentially contains all light flux in a band of wavelengths from 340 to 410 nanometers; the independently diurnally delivered spectra called "ultra blue" essentially contains all light flux in a band of wavelengths from 390 to 465 nanometers; the independently diurnally delivered spectra called "aqua blue" essentially contains all light flux in a band of wavelengths from 430 to 500 nanometers; the independently diurnally delivered spectra called "green" essentially contains all light flux in a band of wavelengths from 500 to 550 nanometers; the independently diurnally delivered spectra called "gold orange" essentially contains all light flux in a band of wavelengths from 565 to 660 nanometers; the independently diurnally delivered spectra called "red" essentially contains all light flux in a band of wavelengths from 620 to 680 nanometers; the independently diurnally delivered spectra called "ultra red" essentially contains light in a band of wavelengths from 640 to 690 nanometers; and the independently diurnally delivered spectra called "far red" essentially contains light in a band of wavelengths from 705 to 755 nanometers.

The independently delivery—diurnally at and during at least three different time periods of the least three different spectra of PAR—preferably also independently delivers these at least three spectra at at least three different intensity, or flux, levels.

For such three or more of the spectra as are in fact delivered, these different spectra are preferably delivered to the plant at the following relative intensity, or flux, levels: 1) the spectra called "ultraviolet" is delivered at a relative flux level of 40±10; 2) the spectra called "ultra blue" is delivered at a relative flux level of 160±10; 3) the spectra called "aqua blue" is delivered at a relative flux level of 80+10; 4) the spectra called "green" is delivered at a relative flux level of 20±10; 5) the spectra called "gold orange" is delivered at a relative flux level of 80±10; 6) the spectra called "red" is delivered at a relative flux level of 80±10; 7) the spectra called "ultra red" is delivered at a relative flux level of 160±10; and 8) the spectra called "far red" is delivered at a relative flux level of 30±10.

7. Independent Diurnal Application of Different Spectra of PAR at Different Intensity, or Flux, Levels In another of its aspects, the present invention is embodied in a method of providing artificial PAR to a plant for growing, where at least three different spectra of PAR are delivered to the plant at at least three different flux levels.

The delivered PAR spectra are preferably drawn from the group consisting of 1) a spectra called "ultraviolet" containing light in a narrow band of wavelengths not broader than 70 nanometers Full Width Half Maximum (FWHM), and including light of 385 nanometers which affects early light-inducible protein, 2) a spectra called "ultra blue" containing light in a narrow band of wavelengths not broader than 75 nanometers Full Width Half Maximum (FWHM), and including light of 420 and 439 nanometers which affects chlorophyll A, alpha carotene, and carotenoids, 3) a spectra called "aqua blue" containing light in a narrow band of wavelengths not broader than 70 nanometers Full Width Half Maximum (FWHM), and including light of 450 and 475 nanometers which affects chlorophyll B, beta carotene, and carotenoids, 4) a spectra called "green" containing light in a narrow band of wavelengths not broader than 50 nanometers Full Width Half Maximum (FWH_M), and including light of 525 nanometers which affects CO2 fixation and intermodal distance, 5) a spectra called "gold orange" containing light in a narrow band of wavelengths not broader than 95 nanometers Full Width Half Maximum (FWHM), and including light of 590 and 625 nanometers which affects phycoerythrin and phycocyanin, 6) a spectra called "red" containing light in a narrow band of wavelengths not broader than 60 nanometers Full Width Half Maximum (FWHM), and including light of 645 nanometers which affects chlorophyll B, chlorophyll C, and allophycocyanin, 7) a spectra called "ultra red" containing light in a narrow band of wavelengths not broader than 50 nanometers Full Width Half Maximum (FWHM), and including light of 667 nanometers which affects chlorophyll A and phytochrome, and 8) a spectra called "far red" containing light in a narrow band of wavelengths not broader than 50 nanometers Full Width Half Maximum (FWHM), and including light of 735 nanometers which affects chlorophyll D and phytochrome.

A still further 9) spectra called "white" containing broadband light used for plant inspection and maintenance is also preferably independently delivered, As before, application of this "white" spectra is optional. This "white" spectra is substantially inconsequential to plant growth, good or bad. Since it permits humans to better view the plants, and it costs but little extra to apply, this "white" spectra is commonly applied during that portion of the day when the plants might be expected to be inspected by human viewers.

Most preferably, the independently diurnally delivered spectra called "ultraviolet" essentially contains all light flux in a band of wavelengths from 340 to 410 nanometers; the independently diurnally delivered spectra called "ultra blue" essentially contains all light flux in a band of wavelengths from 390 to 465 nanometers; the independently diurnally delivered spectra called "aqua blue" essentially contains all light flux in a band of wavelengths from 430 to 500 nanometers; the independently diurnally delivered spectra called "green" essentially contains all light flux in a band of wavelengths from 500 to 550 nanometers; the independently diurnally delivered spectra called "gold orange" essentially contains all light flux in a band of wavelengths from 565 to 660 nanometers; the independently diurnally delivered spectra called "red" essentially contains all light flux in a band of wavelengths from 620 to 680 nanometers; the independently diurnally delivered spectra called "ultra red" essentially contains light in a band of wavelengths from 640 to 690 nanometers; and the independently diurnally delivered spectra called "far red" essentially contains light in a band of wavelengths from 705 to 755 nanometers.

Such of those different spectra of PAR as are, in fact, actually delivered to the plant are preferably so delivered at the following relative intensity, or flux, levels: 1) the spectra called "ultraviolet" is delivered at a relative flux level of 40±10; 2) the spectra called "ultra blue" is delivered at a relative flux level of 160±10; 3) the spectra called "aqua blue" is delivered at a relative flux level of 80±10; 4) the spectra called "green" is delivered at a relative flux level of 20±10; 5) the spectra called "gold orange" is delivered at a relative flux level of 80±10; 6) the spectra called "red" is delivered at a relative flux level of 80±10; 7) the spectra called "ultra red" is delivered at a relative flux level of 160±10; and 8) the spectra called "far red" is delivered at a relative flux level of 20±10.

8. Fundamental Principles of the Staged Application of PAR of Multiple (Narrowband) Colors to Grow Plants So far it has been described that two aspects of the present invention are embodied in methods that diurnally independently apply at least three different spectra of PAR at at least three different times to grow the plant. Most preferably (1) some eight (8) different narrowband spectra of PAR (plus an ninth broadband "white" spectra insignificant to plant growth), (2) each at an independent intensity, or flux, are used (3) at least three, and typically all, at different times, in order to grow the plant. This flexibility and versatility in (1) spectra, (2) flux and (3) time is, needless to say, not without purpose, and is not so as to have complexity for complexity's sake. Instead, this versatility and flexibility in the application of narrowband PAR can be employed to realize certain lighting (PAR) conditions to which the plant responds well. Accordingly, as a still further aspect of the present invention, the present invention is embodied in several different, but compatible, schemes for diurnally applying PAR to best grow the plant. As will shortly be seen, these schemes sometimes, but not always, mimic the natural PAR occurring in the out of doors at those latitudes to which the plant is native.

Despite (1) the information density of the graph of FIGS. 2a and 2b showing that application of nine (9) various "color palettes" of PAR to optimally grow kale plants, mid growing season; and of (2) the associated LED lights of FIGS. 2a-3c detailing the LEDs, and the corresponding colors, that go to make up each of the nine palettes; the present invention contemplates certain fundamental, organizing, principles of the application of (multiple) (preferably narrowband) colored lights as artificial PAR.

8.1 For Many Plants Narrowband Colors of Artificial PAR should Vary on a Cycle of from Two Hours to Two Days, and Nominally One Day, in Length It is known that the color(s) of applied PAR may vary over the growing season of a plant. PAR having a greater relative component of blue? light is useful to sprout and/or grow the plant, while PAR having a greater relative component of red? light is useful to fruit, and/or to mature, the plant. It is also known that, for certain plants that do not grow well under continuous PAR that the PAR can be cycled "ON" and "OFF", including on a daily basis.

The present invention contemplates that various colors of PAR—typically "color palettes" each consisting of from 1 to 9 different colors of PAR—should be applied at and on a cycle of from two hours to two days, and nominally one day, in length in order to grow plants. The various color palettes need not cycle at the same cycle length—but normally do—and this same cycle length is typically one day. The times, and time durations, when each color palette is cycled "ON", and cycled "OFF", need not be any of coincident, overlapping, of equal duration(s), and/or in equal and/or in constant relative phase(s) and sequence(s), The various colors, and color palettes, need not be of equal intensity(ies), or equal relative intensity(ies).

8.2 Blue Lights Preferably go "ON" Before Red Lights, and "OFF" Before Red Lights The 80% predominance (by combined lumens outputs) of blue lights (410 nm.) to 500 nm) turn "ON" more that one hour prior to the 80% predominance of red lights (670 nm. to 670 nm), and turn "OFF" more that one hour prior to said red lights.

The Blue lights preferably go "ON" at least 1/12, and more preferably 1/6 of the total blue light illumination period before the red lights of "ON", and go "OFF" before the red lights at a like interval. Thus if the total blue light illumination period is twelve (12) hours than the blue lights preferably go "ON" at least 1/12×12=1 hour, and more preferably 1/6×12=2 hours, of the total 12 hour blue light illumination period before the red lights of "ON", and go "OFF" before the red lights at a like 1-2 hour interval.

8.3 The Blue and the Red Light are Preferably Neither Turned "ON" to Full Intensity Instantaneously, Nor Turned "OFF" Instantaneously In accordance with the present invention at least the blue and the red lights, and preferably all lights of all colors, are turned neither "ON" nor "OFF" instantaneously, but are instead turned "ON' and turned "OFF" gradually over a period of at least 15 minutes, and more preferably a period of ½ hour or more.

Under the U.S. Patent Law, Title 35 United States Code, the inventors are not held to be possessed of a correct theory about how or why this works. However, the inventors hypothesize, and as a metabolic aspect more readily observed and provable in animals, that plants also need time to "wake up" in the "morning", and to "shut down" in the "evening", and that the plants respond by growing better when they are eased into these photo-illumination, and photochromic, transitions.

8.4 Infrared Light Illumination "Ramps Up" in the Final Half of the Period of all Visible Red Light Illumination, Peaks in Intensity after Visible Red Light Illumination has Ceased, and Persists at Least 1 Hour after Visible Red Light Illumination has Ceased The preferred application invisible infrared, "IR", light as a color in the present invention is different than the application of lights of all other colors.

Infrared (IR) light illumination "ramps up" in the final half of the period of all visible red light illumination. This "ramp up", or progressive increase in intensity, is slower than the ramp period of all other light colors, and preferably lasts more than four hours.

The infrared, IF, light peaks in intensity after visible red light illumination has ceased, and preferably persists at least 1 hour after visible red light illumination has ceased.

Under the U.S. Patent Law, Title 35 United States Code, the inventors are not held to need have a correct theory about how or why this works. However, the inventors hypothesize that plants can gather long wavelength, infrared, heat energy from the sky even after the sun has set, and that this protraction of infrared (IR) illumination simulates this natural condition, optimizing plant growth.

8.5 Even Among the Selected (Narrowband) Colors Selectively Applied, not Only are all Colors not Applied at the Same Intensity(ies), but Different Colors (Color Palettes) are Preferably Applied at Intensity Variations Ranging to Times Two (×2) and More In accordance with the present invention multiple selected (narrowband) colors are selectively applied, normally in the form of "color palettes", as optimally colored PAR to grow plants. These different colors (color palettes)—even if applied for roughly the same durations—are preferably not applied at the same intensity or intensities, but are preferably applied at intensity variations ranging to times two (×2) and more.

A "color palettes" arbitrarily called "red" which, quite naturally, contains LEDs in the wavelength range from 620 to 680 nanometers producing "red" lights is administered with greatest photonic (lumen) intensity. Meanwhile a "color palette" arbitrarily called "aqua blue" which, quite naturally, contains LEDs in the wavelength range from 430 to 500 nanometer producing "blue" lights is administered with least photonic (lumen) intensity, most preferably less than one-half (½) the intensity of the red lights.

Under the U.S. Patent Law, 35 United States Code, the inventors are not held to need have a correct theory about how or why this works. However, the inventors hypothesize that plants can use long wavelength, red, illumination better in its photosynthetic processes, and/or that it gathers red radiation less efficiently, and, consequently, it needs more red radiation than radiation of other colors.

8.6 Applied UV Light Varies Greatly in Intensity During the Period of its Application In accordance with the present invention applied UV light, 340 nm.-410 nm., varies greatly in intensity during the period of its application, most preferably for 0% ("OFF") to 100% (full "on") in cycles of, most preferably, about 4 hours during, most preferably, a 12 hour period of application.

Under the U.S. Patent Law, 35 United States Code, the inventors are not held to need have a correct theory about how or why this works. However, the inventors hypothesize that plant somehow becomes "saturated" with UV light that induces a "growth spurt", and can beneficially be permitted to "relax" after a hour or so "growth spurt" while further nutrients and water are moved from the roots to the stem, leaves and fruits of the plant.

8.7 Applied "Ultra Blue" Light Varies Greatly in Intensity During the Period of its Application In accordance with the present invention applied "Ultra Blue" light, 390 nm.-465 nm., varies in intensity at least 10% during the period of its application, most preferably from 90% ("LOW") to 100% (full "on") in cycles of, most preferably, about 2 hours during, most preferably, a 12 hour period of application.

The inventors hypothesize that variation in the intensity of the "ultra blue" spectra of applied artificial PAR is useful for the same reasons as for the variation in the intensity of the applied "UV" spectral discussed in section 8.6 above.

These and still other aspects and attributes of the present invention are explained in the following drawings and accompanying specification.

DESCRIPTION OF THE PREFERRED EMBODIMENT

Figure 1:
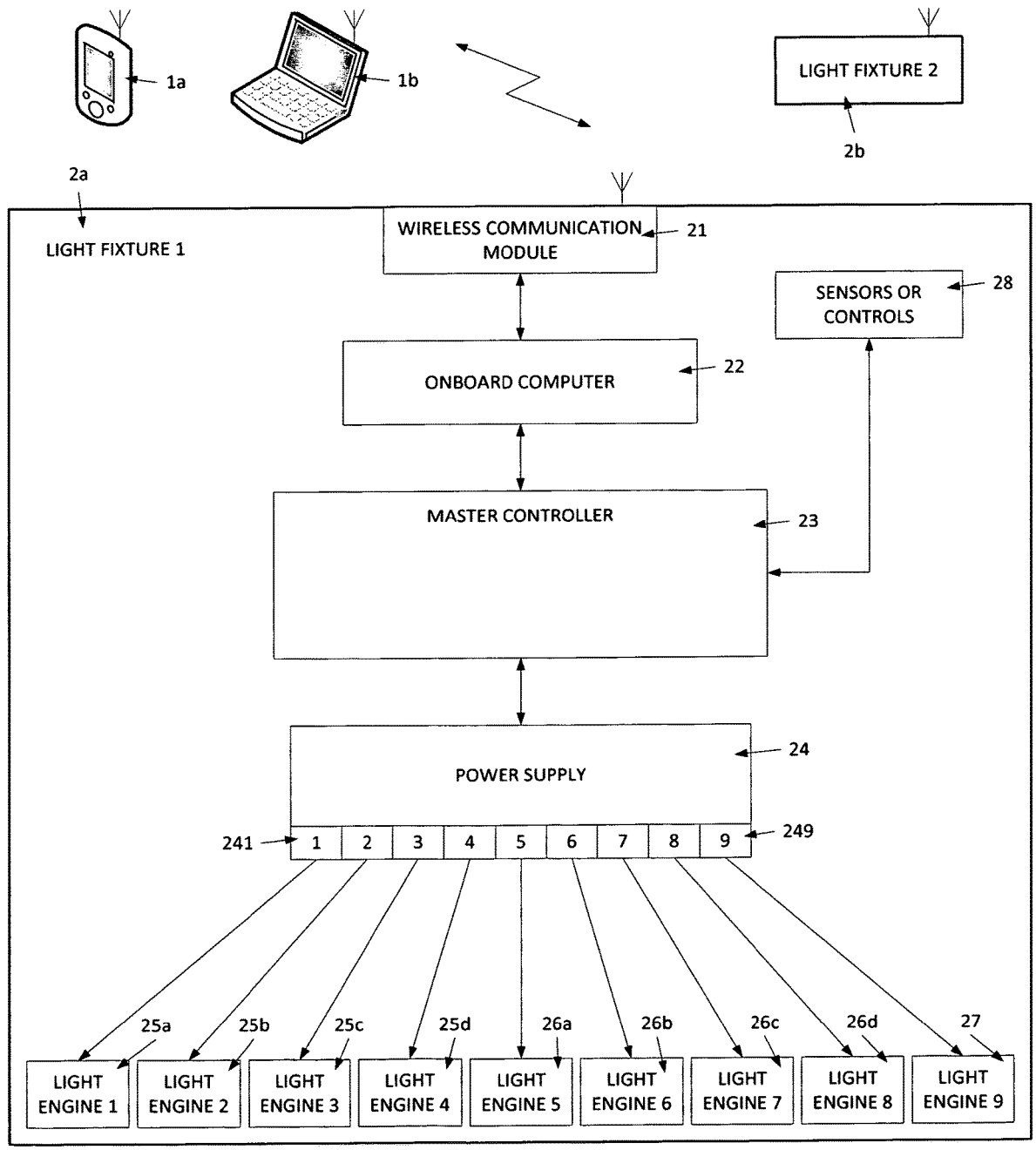
FIG. 1 is a system block diagram of an LED-based lighting system in accordance with the present invention controllable for producing those nine complex spectrums of artificial PAR seen in FIG. 2.

A block diagram of an LED-based lighting system in accordance with the present invention controllable for producing complex spectrums of artificial PAR (later seen in FIG. 2) is shown in FIG. 1. A USER WIRELESS DEVICE normally in the form of a SMARTPHONE 1a, or a COMPUTER 1b or the like wirelessly controls a selectable one of a number of LIGHT FIXTURES, for example LIGHT FIXTURE 2a or LIGHT FIXTURE 2b. The LIGHT FIXTURE 2a receives the wireless control signal from the USER WIRELESS DEVICE 1a, 1b in its WIRELESS COMMUNICATION MODULE 21, and furthers these control signals to drive and ONBOARD COMPUTER 22 that itself controls a MASTER CONTROLLER 23, LIGHT ENGINES 25, 26, 27 for, ultimately, the control of a POWER SUPPLY 34 having nine separate level-controllable LED DRIVERS 241-249 the power outputs of which are distributed to a plurality of LIGHT ENGINES (or fixtures) 25, 26, 27. All nine LED DRIVERS 241-141 are of equal construction, and thus have the same current and voltage outputs. Likewise, all the LIGHT ENGINES 1-9 have the same number of LEDs (although of different colors), and thus consumer roughly the same power.

A first group of four LED DRIVERS 241-244 controls a like first number of LIGHT ENGINES 1-4 25a, 25b, 25c, and 25d. A second group of four LED DRIVERS 245-248 controls an like second number of LIGHT ENGINES 5-8 26a, 26b, 26c and 26d. A third and final LED DRIVER 249 controls a single LIGHT ENGINE 9 27. The power outputs of the nine LIGHT ENGINES 1-9 are variously physically distributed to power groups of LEDs on chip carrier of three different types as will ultimately be seen in FIGS. 3a-3c.

Figure 2A:
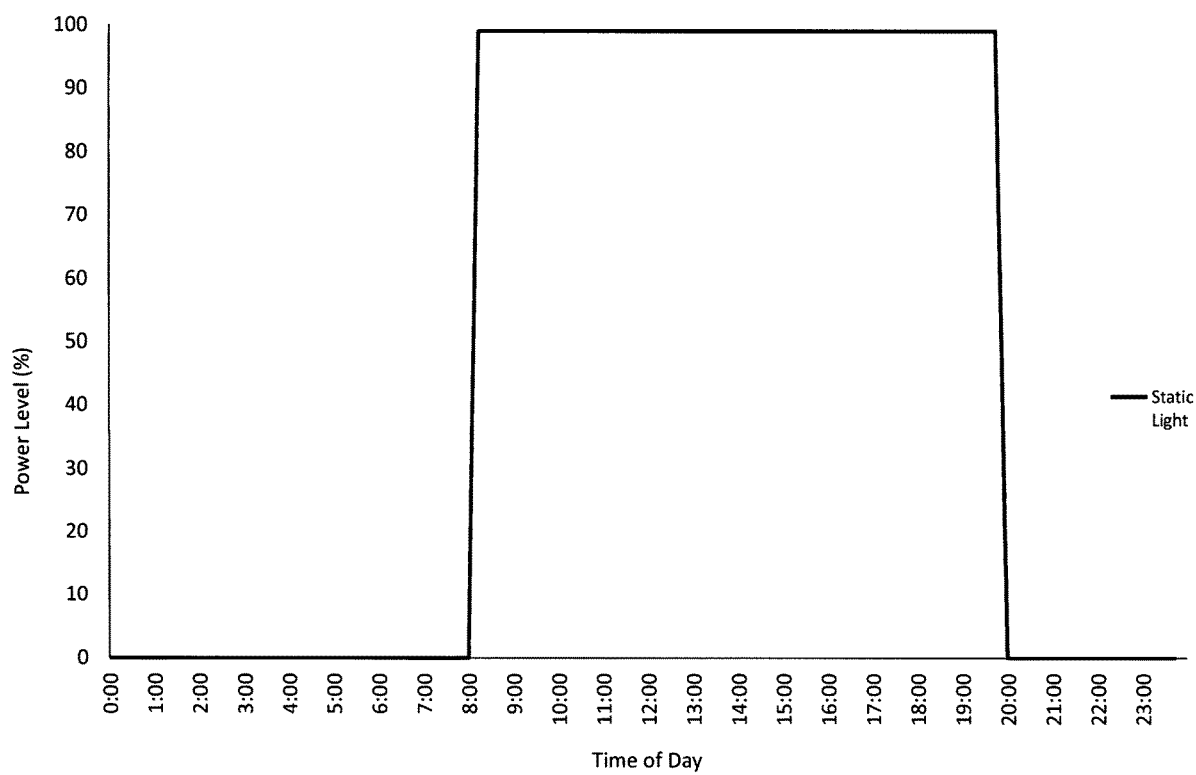
FIG. 2a is a graph showing an exemplary prior art application of PAR illumination to a plant to engender growth of the plant.
Figure 2B:
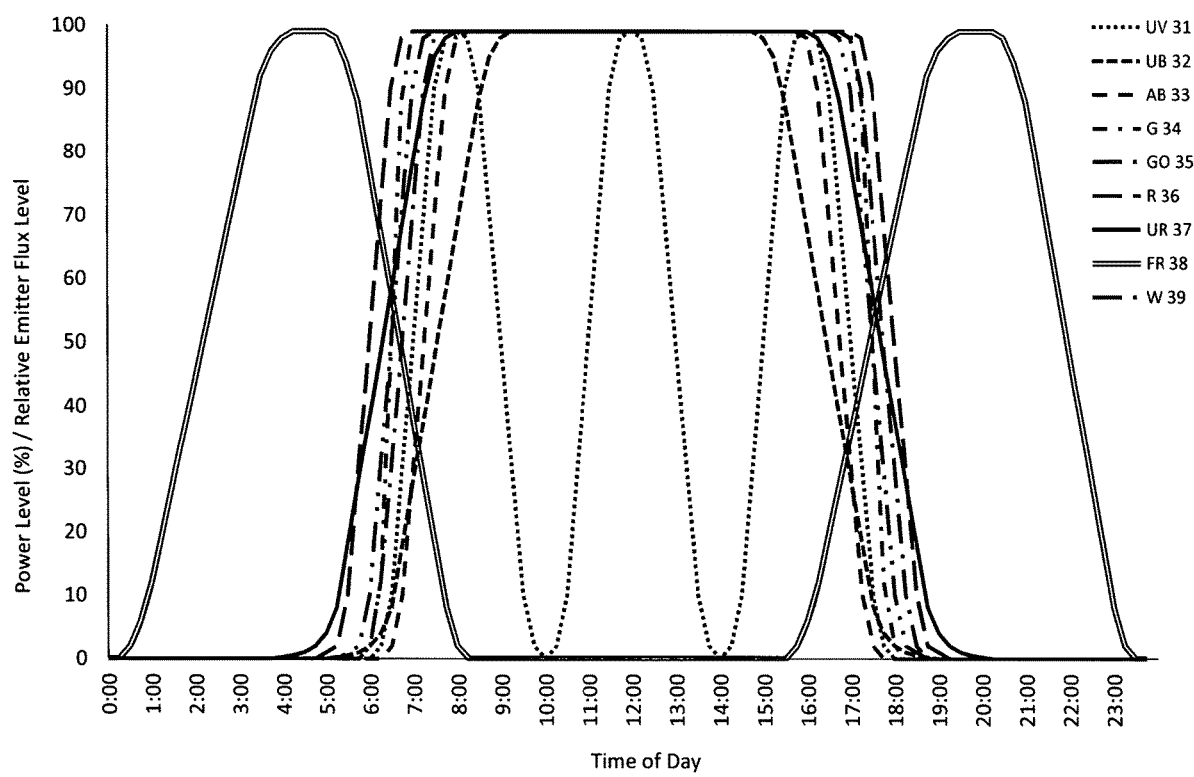
FIGS. 2b and 2c are graphs showing the phased application of a nominal nine (9) different color palettes of PAR to the growing of kale plants at the middle of the growing season for kale.
Figure 2C:
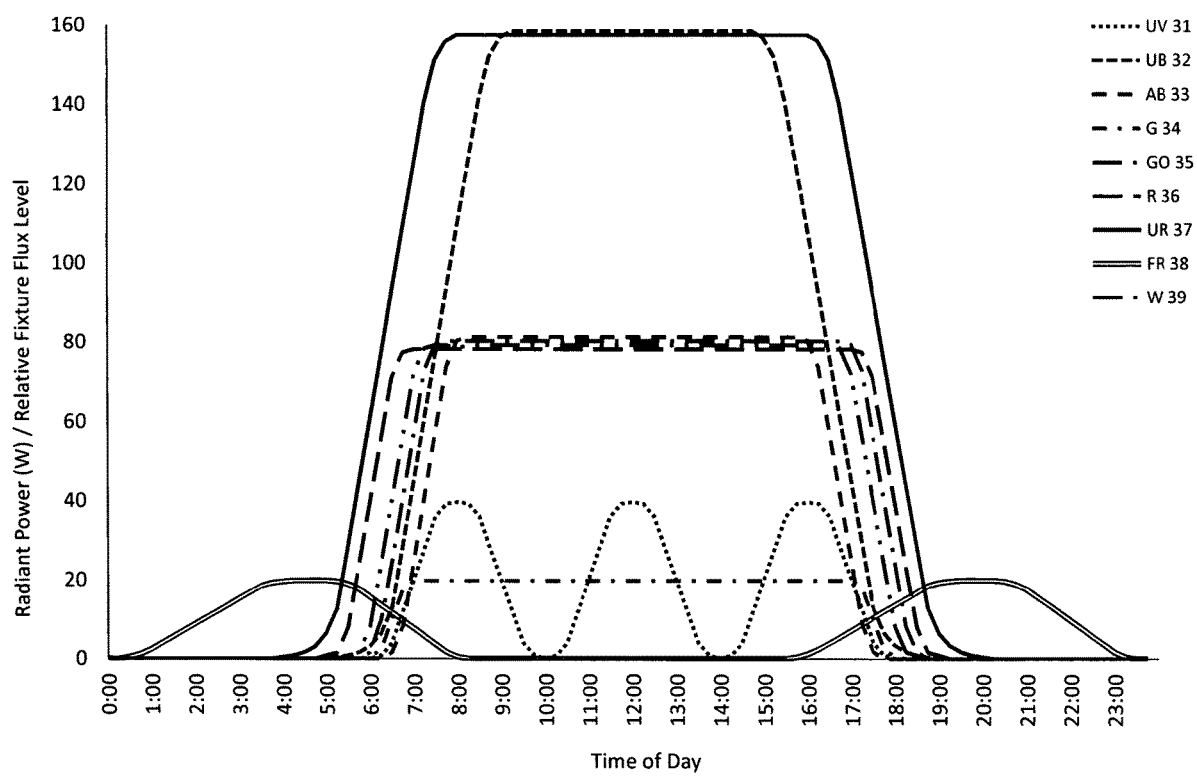

Three graphs showing the phased application of a nominal nine (9) different color palettes of PAR to the growing of kale plants at the middle of the growing season for kale are shown in FIGS. 2b and 2c.

FIG. 2a is a prior art graph of an exemplary application of power (electrical energization) to grow lights in the prior art. As may be observed all lights—whatsoever type(s), color(s) and intensity(ies) they may be—are most commonly "OFF for certain number of hours—nominally 12 hours in the FIG. 2a graph—and "ON' for a complementary number of hours—again nominally 12 hours in the FIG. 2a graph. In accordance with the present invention this simplistic application of PAR is not optimal to either (1) save electricity, nor (2) grow the plant (the kale). A very greatly more sophisticated application of PAR is optimal both to save electricity—typically up to one-half—and optimally grow the plant—up to times two (×2) greater mass—in less time—typically up to 10% less.

The phased application of a nominal nine (9) different color palettes of narrowband LED lights to produce, by way of example, a composite PAR suitable to the growing of, by way of example, of kale plants at, by way of example, the middle of the growing season for kale, is shown in the graphs of FIGS. 2b and 2c. FIG. 2b is a graph of the dynamic power level of each of the nine light arrays versus the time of day, and FIG. 2c is a graph of the radiant power of the same nine color palettes versus the time of day.

As may be observed, the nine color palettes of PAR are cyclically produced and applied on a diurnal, daily, 24-hour period. At least one, and typically two or more, of the individually colored lights of each palette are of a color different from all other palettes, as will be better seen in FIG. 4. The nine palettes, and an exemplary wavelength contained within that palette are thus:

(1) "UV" ultraviolet palette 31, UV; contains 360±20-390±20 nm., or 340-410 nm.;

(2) "UB" ultra blue palette 32, contains 410±20-445±20 nm., or 390-465 nm.;

(3) "AB" aqua blue palette 33, contains 450±20-480±20 nm., or 430-500 nm.;

(4) "G" green palette 34, contains 520±20-530±20 nm., or 500-550 nm.;

(5) "GO" gold orange palette 35, contains 585±20-630±20 nm., or 565-650 nm.;

(6) "R" red palette 36, contains 640±20-660±20 nm., or 620-680 nm.;

(7) "UR" ultra red palette 37, contains 660±20-670±20 nm., or 640-690 nm.; and (8) "FR" infrared, or far red, palette 38, or IR, contains 725+20-735±20 nm., or 705-755 nm.; and (9) "W" white palette 39, contains light of 4000-6000 degrees Kelvin color temperature As may noted from the graphs of FIGS. 2*b* and 2*c*, at least a temporal portion of the times of application of each color palette is partially, but not completely, temporally overlapping with the times of application of all other palettes.

At least one palette, for example color palette 37, has one or more lights all of which are of a longer wavelength, or "redder", than are the lights of at least one other palette, for example color palette 33. This palette of lights of longer wavelengths is called a "ultra red palette" 37 and the palette of lights of shorter wavelengths is called the "aqua blue palette" 33. The importance of this is that lights of the "aqua blue palette" 33 are, within the 24-hour cycle, applied at a first time (about 7:00 A.M.) before the lights of the "ultra red palette" 37 are applied at a second time (about 9:00 A.M.). This clearly makes that, between the first time and the second time, the plant receives more blue light than red light. Next note that at a third time, about 18:30, lights of the "aqua blue palette" 33 are no longer applied while it is only at a later, fourth time, approximately 19:00. that lights of the "ultra red palette" 37 cease. This clearly makes that, between the third time and the fourth time, the plant receives more red light than blue light.

Between, on the one hand, the first and the second times, and, on the other hand, the third and the fourth times, and while light from both the "aqua blue palette" 33 and the "ultra red palette" 37 are both still being applied at the same time to the plant, yet another palettes having one or more lights producing illuminations at least some of which illuminations are of a still longer wavelengths, or "infrared", to even those wavelengths of light than are associated with the lights of the "ultra red palette" 37, are applied. This palette is called "far red (infrared) palette" 38. Notably for this "far red (infrared) palette" 38, it also ceases to be applied, but only after both the third time (when light from the aqua blue palette 33 ceases) and the fourth time (when light from the red palette 37 ceases). In fact, this "far red (infrared) palette" 38 is preferably the last palette to start, and the last palette to cease, of all the palettes of applied light palettes 31-39.

As may also be observed in FIGS. 2*b* and 2*c*, the cyclical application of light illuminations from the plurality of color illumination palettes 31-39 to grow a plant is preferably so that the full colored light illuminations from each color palette 31-39 neither commence nor cease instantaneously, but instead ramp up to from "no" to "full" illumination intensity, and also ramp down from "full" illumination intensity to "no" illumination intensity. It does so over "turn on" and "turn off" periods that are most preferably of durations of at least ten minutes each.

Although the cyclic period shown in FIGS. 2*b* and 2*c* is 24 hours, the period may be as short as two hours and as long as two days.

The collective color palettes 31-39 as are applied to illuminate the plant collectively serve to simulate a sunlit day upon the surface of the earth in the earth latitudes to which the plant—kale—is native.

The preferred nine (9) color palettes of PAR are preferably produced in and by three different chip carriers. Each carrier nominally has 8 columns of 20 LEDs per column for a total of 160 LEDs per carrier. Each carrier is nominally independently powered in four groups of two columns each group, thus making that 2 columns×20 LEDs each column=40 LEDs are powered in each group. Each carrier nominally independently selectively produces (in accordance that the associated groups are or are not powered) three (3) of the nine (9) total palettes.

Figure 3A:
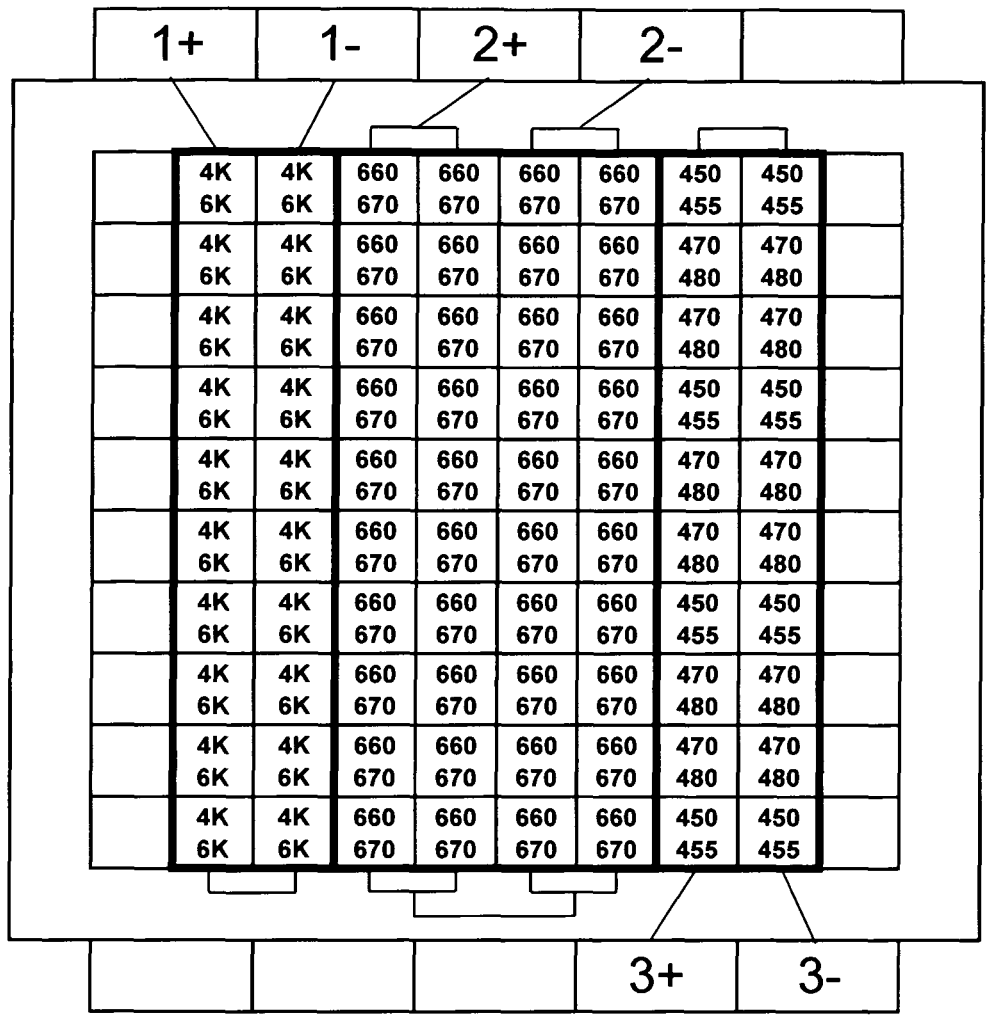
FIG. 3, consisting of FIGS. 3a through 3c, are top plan views of three different LED chip carriers, 8×10=80 LED chips each carrier, the LED chips of each carrier being controllably selectively in three groups (20 or 40 LED chips per group) to produce three "color palettes" of multiple narrowband colored LED lights that are collectively used to realize the PAR spectrums shown in FIG. 2; wherein each figure has a legend listing the three color palettes, or spectra, produced by the three groups (20 of 40 LED chips per group) that are upon that chip carrier.

For example, the LED chip carrier "type A" shown in FIG. 3*a* carries on a "channel 1" one (only) column having some 40 LEDs of 4000-6000 degrees Kelvin color temperature, otherwise known as a "white" palette. See FIGS. 2*b* and 2*c*. LED chip carrier "type A" shown in FIG. 3*a* also carries on a "channel 2" some two columns of 40 LEDs each column (80 LEDs total) all of 660-670 nm. wavelengths, otherwise known as a "ultra red" palette. Again see FIGS. 2*b* and 2*c*. Finally LED chip carrier "type A" shown in FIG. 3*a* still further carries on a "channel 3" a column of (a) some LEDs all of 450-495 nm. wavelengths plus (b) other 12 LEDs if 470-380 nm. wavelengths, these 40 LEDs collectively emitting a spectrum known as an "aqua blue" palette. Still yet again see FIGS. 2*b* and 2*c*.

Note that energization of the "channel 1" energizes some 40 "white" LEDs, energization of the "channels 2" energizes some 80 "ultra red" LEDs, and energization of the "channel 4" will energize some 40 "aqua blue' LEDs. Consider the relative power, or intensities of the palettes of different colors as are shown in FIG. 2*c*. The total power, or intensity, of the "ultra red" spectrum (as and when fully energized) is roughly twice (×2) that of the "white", or of the "aqua blue" palette as and when these palettes are energized. This difference in power, and in intensity, is quite clearly due to the number of LEDs that are within each palette.

Figure 3B:
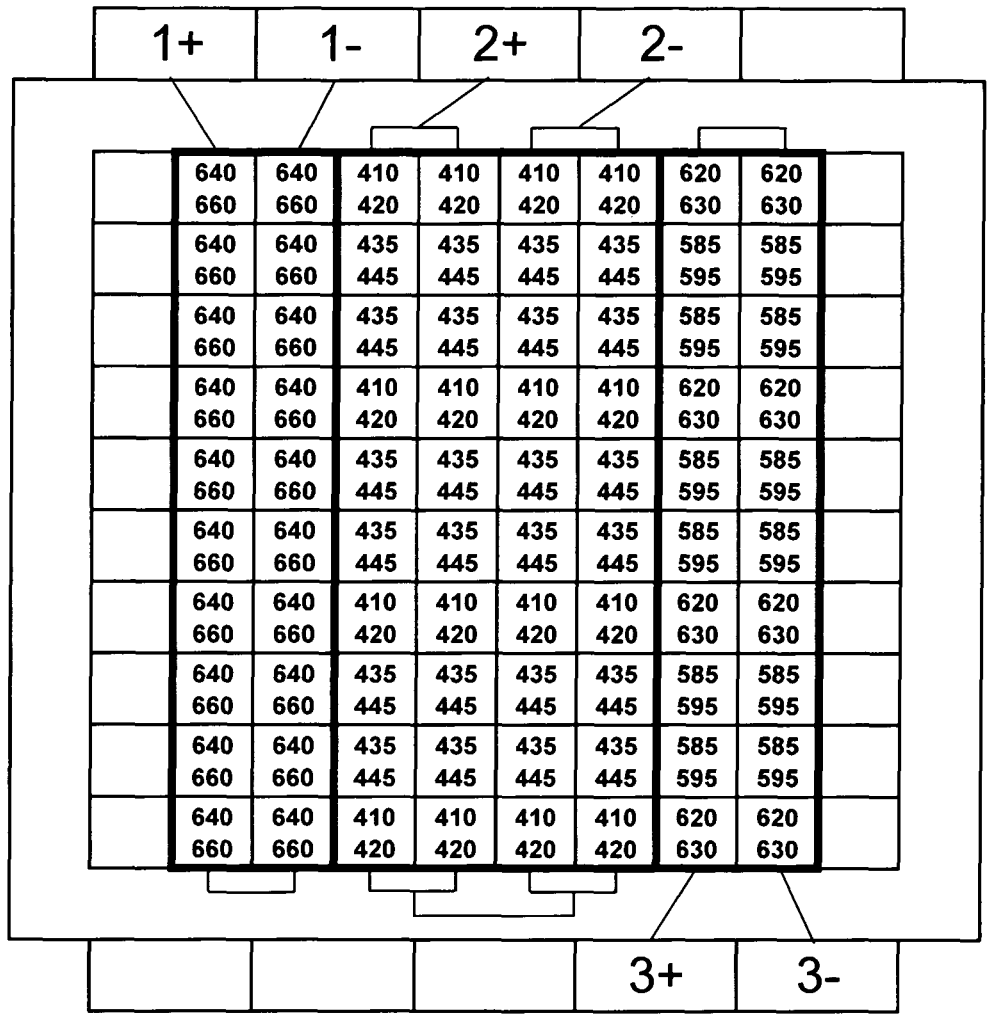
Figure 3C:
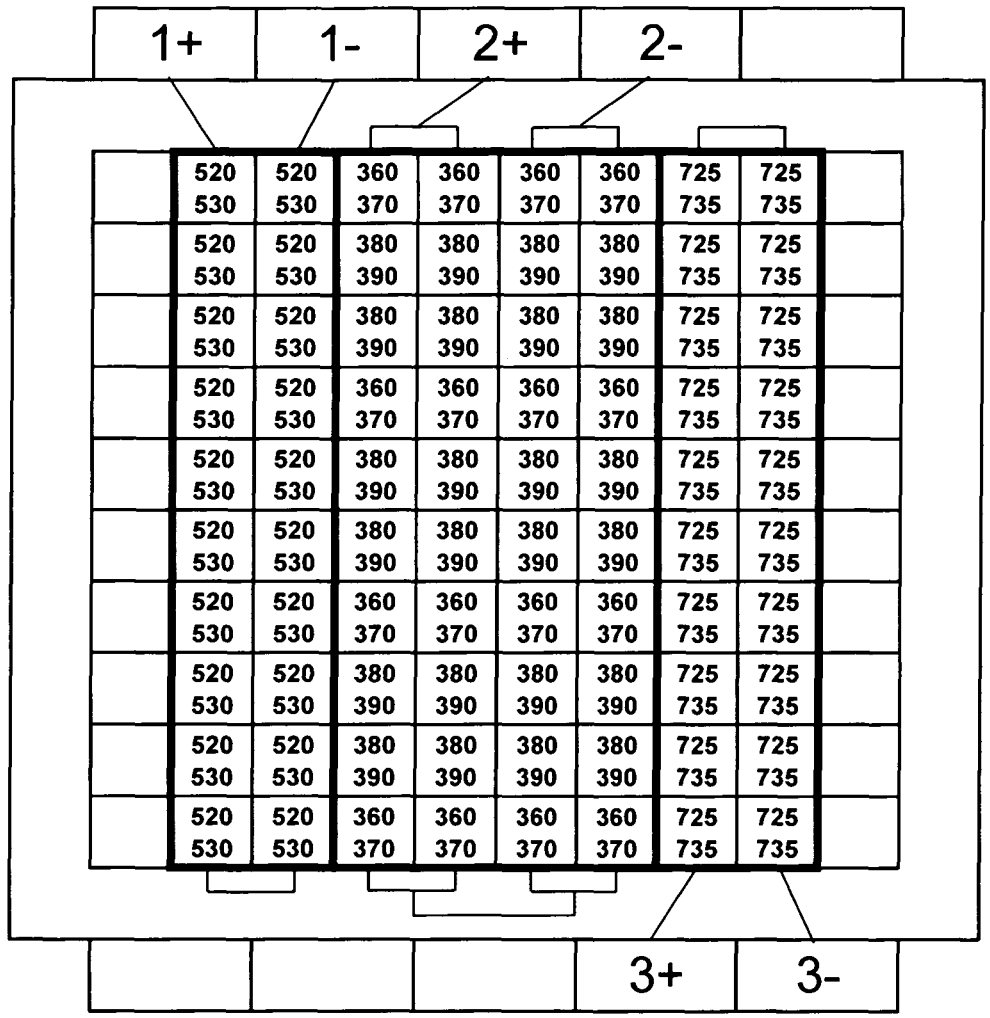

Note also that the LEDs are powered in groups of 40, or of 80, as such groups are present upon a single chip carrier. The controllable output LIGHT ENGINES 1-9 25*a-d*, 26*a-d* and 27 shown in the schematic block diagram of FIG. 1 are allocated among and between the groups of LED lights as are shown in FIGS. 3*a*-3*c*. Clearly as the LIGHT ENGINES 1-9 are separately independently controllable then so are the LED lights that are within the groups upon each chip carrier, making that the spectra of FIGS. 2*b* and 2*c*, and still others, may be realized.

Continuing in FIG. 3, the LED chip carrier "type B" shown in FIG. 3*b* carries on a "channel 1" some 40 LEDs of 640-660 nm. wavelength, otherwise known as a "red" palette. See FIGS. 2*b* and 2*c*. LED chip carrier "type B" shown in FIG. 3*b* also carries on "channel 2" some LEDs of 410-430 nm. wavelengths plus other LEDs of 435-495 nm. wavelengths, or a total of 80 LEDs collectively otherwise known as a "ultra blue" palette. Again see FIGS. 2*b* and 2*c*. Finally LED chip carrier "type B" shown in FIG. 3*b* still further carries on a "channel 3" some LEDs of 585-595 nm. wavelengths plus other LEDs if 620-660 nm. wavelengths, or a total of 40 LEDs collectively emitting what is otherwise known as a "gold orange" palette. Still yet again see FIGS. 2*b* and 2*c*.

Finally in FIG. 3, the LED chip carrier "type C" shown in FIG. 3*c* carries on a "channel 1" some 40 LEDs of 520-560 nm. wavelengths, otherwise known as a "green" palette. See FIGS. 2*b* and 2*c*. LED chip carrier "type B" shown in FIG. 3*c* also carries on "channels 2" some LEDs of 360-379 nm. wavelengths plus other LEDs of 380-410 nm. wavelengths, or a total of 80 LEDs collectively emitting a what is known as an "ultraviolet" palette of light. Again see FIGS. 2*b* and 2*c*. Finally LED chip carrier "type c" shown in FIG. 3*c* still further carries on a "channel 3" some 40 LEDs of 725-735 nm. wavelengths collectively otherwise known as a "far red" palette. Still yet again see FIGS. 2b and 2c.

The color palettes, the timing of the illuminations of the same, shown in FIGS. 2b and 2c are thus due to the arrays of colored LEDs in the LED chip carriers types A-C shown in FIGS. 3a-3c, and in the selective energization of each of these total nine (9) different groups of LEDs, or "color palettes", by the nine LIGHT ENGINES 1-9 25a-d, 26a-d and 27 shown in FIG. 1.

According to these variations, and still others within the skill of a practitioner of the artificial grow light, or PAR, arts, the present invention should be considered in accordance with the following claims, only, and not solely on accordance with those embodiments within which the invention has been taught.

The invention claimed is:

1. A method of providing artificial Photosynthetically Active Radiation (PAR) to a plant for growing, the method comprising:

independently delivering diurnally at and during at least three different time periods at least three different spectra of PAR with at least three different flux levels selected from the group consisting of 1) a spectra called "ultraviolet" containing light in a band of wavelengths from 340 to 410 nanometers, wherein the ultraviolet spectra is delivered at a relative flux level of 40 Watt (W)±10%, 2) a spectra called "ultra blue" containing light in a band of wavelengths from 390 to 465 nanometers, wherein the ultra blue spectra is delivered at a relative flux level of 70 W±10%, 3) a spectra called "aqua blue" containing light in a band of wavelengths from 430 to 500 nanometers, wherein the aqua blue spectra is delivered at a relative flux level of 80 W±10%, 4) a spectra called "green" containing light in a band of wavelengths from 500 to 550 nanometers, wherein the green spectra is delivered at a relative flux level of 20 W±10%, 5) a spectra called "gold orange" containing light in a band of wavelengths from 565 to 650 nanometers, wherein the gold orange spectra is delivered at a relative flux level of 80 W±10%, 6) a spectra called "red" containing light in a band of wavelengths from 620 to 680 nanometers, wherein the red spectra is delivered at a relative flux level of 80 W±10%, 7) a spectra called "ultra red" containing light in a band of wavelengths from 640 to 670 nanometers, wherein the ultra red spectra is delivered at a relative flux level of 160 W±10%, and 8) a spectra called "far red" containing light in a band of wavelengths from 705 to 755 nanometers, wherein the far red spectra is delivered at a relative flux level of 20 W±10%.

2. The method according to claim 1 wherein the independently delivering diurnally at and during at least three different time periods of the least three different spectra of PAR does still further and also independently deliver 9) a spectra called "white" containing broadband light used for plant inspection and maintenance.

3. The method of claim 1, wherein the method utilizes a wireless device to control the providing of the artificial PAR to a plant.

4. The method of claim 1, wherein the method is controlled by a smartphone or a computer.

5. The method of claim 4, wherein method comprises having the smartphone or computer communicate with one or more sensors and controls.

6. The method of claim 5, wherein the method comprises having the one or more sensors or controls linked to one or more light fixtures not providing the PAR.

7. The method of claim 6, wherein the additional one or more light fixtures supply a spectra called "white" containing broadband light used for plant inspection and maintenance.

\* \* \* \* \*

UNITED STATES PATENT AND TRADEMARK OFFICE
CERTIFICATE OF CORRECTION

PATENT NO. : 11,457,568 B2  
APPLICATION NO. : 14/544268  
DATED : October 4, 2022  
INVENTOR(S) : McCord Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this  
Twenty-eighth Day of January, 2025

Coke Morgan Stewart  
*Acting Director of the United States Patent and Trademark Office*